US012639571B2

(12) United States Patent
Tseng et al.

(10) Patent No.: US 12,639,571 B2
(45) Date of Patent: May 26, 2026

(54) EARLY CLASSIFICATION METHOD AND ELECTRICAL DEVICE FOR MULTI-OBJECTIVE OPTIMIZATION

(71) Applicant: National Yang Ming Chiao Tung University, Hsinchu City (TW)

(72) Inventors: Shin-Mu Tseng, Hsinchu City (TW); Gary Yen, Stillwater, OK (US)

(73) Assignee: National Yang Ming Chiao Tung University, Hsinchu City (TW)

( * ) Notice: Subject to any disclaimer, the term of this patent is extended or adjusted under 35 U.S.C. 154(b) by 567 days.

(21) Appl. No.: 18/220,402

(22) Filed: Jul. 11, 2023

(65) Prior Publication Data

US 2025/0021811 A1     Jan. 16, 2025

(51) Int. Cl.
*G06N 3/08* (2023.01)

(52) U.S. Cl.
CPC ..................................... *G06N 3/08* (2013.01)

(58) Field of Classification Search
CPC ...................................................... G06N 3/08
USPC .......................................................... 706/15
See application file for complete search history.

(56) References Cited

U.S. PATENT DOCUMENTS

| | | | | | |
|---|---|---|---|---|---|
| 11,120,333 | B2 * | 9/2021 | Qiao | ......................... | G06N 3/08 |
| 11,379,685 | B2 * | 7/2022 | Chen | ..................... | G06N 3/0895 |
| 2015/0206051 | A1 * | 7/2015 | McIntosh | ............... | G06N 3/049 |
| | | | | | 706/15 |

| | | | | | |
|---|---|---|---|---|---|
| 2016/0292418 | A1 * | 10/2016 | Wojnowicz | ........... | G06F 21/562 |
| 2021/0072039 | A1 * | 3/2021 | Shin | .................... | G01C 21/3811 |
| 2022/0004875 | A1 | 1/2022 | Koike-Akino et al. | | |

FOREIGN PATENT DOCUMENTS

| | | |
|---|---|---|
| TW | 202036596 A | 10/2020 |
| TW | 202215302 A | 4/2022 |

OTHER PUBLICATIONS

Kai Zhang et al. "Evolutionary Algorithm for Knee-Based Multiple Criteria Decision Making" IEEE Transactions on Cybernetics 51.2 (2019): 722-735. (ref. 02; file attached).
Yu Huang et al., "Snippet Policy Network V2: Knee-Guided Neuroevolution for Multi-Lead ECG Early Classification," IEEE Transactions on Neural Networks and Learning Systems (Early Access), Jul. 11, 2022 (ref.01).

* cited by examiner

*Primary Examiner* — Teshome Hailu
(74) *Attorney, Agent, or Firm* — CKC & Partners Co., LLC

(57) ABSTRACT
An early classification method with multiple-objectives optimization is provided. The method includes: dividing time series data into multiple snippets; input a snippet into a first machine learning model to obtain a spatial feature vector; calculating, by a recurrent neural network, a current spatiotemporal feature vector according to the spatial feature vector and a previous spatiotemporal feature vector; determining whether to perform early classification according to the spatiotemporal feature vector; if determined not to perform the early classification, processing a subsequent snippet; if determined to perform the early classification, input the spatiotemporal feature vector into a second machine learning model to calculate a predicted label of the time series data. Accordingly, multiple-objectives optimization is achieved.

16 Claims, 4 Drawing Sheets

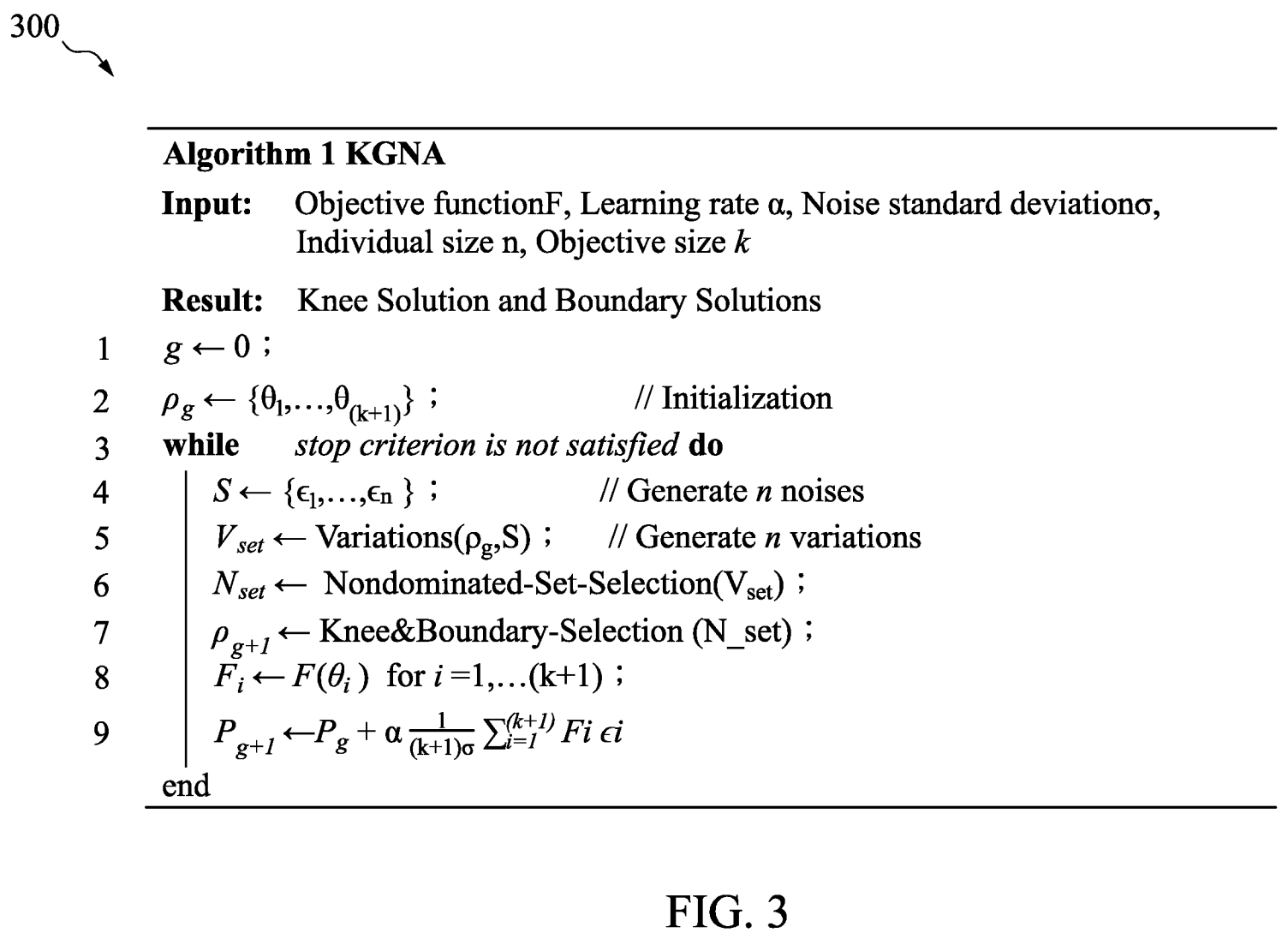

Algorithm 1 KGNA

Input: Objective function $F$, Learning rate $\alpha$, Noise standard deviation $\sigma$, Individual size n, Objective size $k$

Result: Knee Solution and Boundary Solutions

1   $g \leftarrow 0$ ;

2   $\rho_g \leftarrow \{\theta_1, \ldots, \theta_{(k+1)}\}$ ;      // Initialization 3   while *stop criterion is not satisfied* do

4     $S \leftarrow \{\epsilon_1, \ldots, \epsilon_n\}$ ;      // Generate $n$ noises 5     $V_{set} \leftarrow \text{Variations}(\rho_g, S)$ ;      // Generate $n$ variations 6     $N_{set} \leftarrow \text{Nondominated-Set-Selection}(V_{set})$ ;

7     $\rho_{g+1} \leftarrow \text{Knee\&Boundary-Selection (N\_set)}$ ;

8     $F_i \leftarrow F(\theta_i)$ for $i = 1, \ldots, (k+1)$ ;

9     $P_{g+1} \leftarrow P_g + \alpha \frac{1}{(k+1)\sigma} \sum_{i=1}^{(k+1)} F_i \epsilon_i$ end

FIG. 3

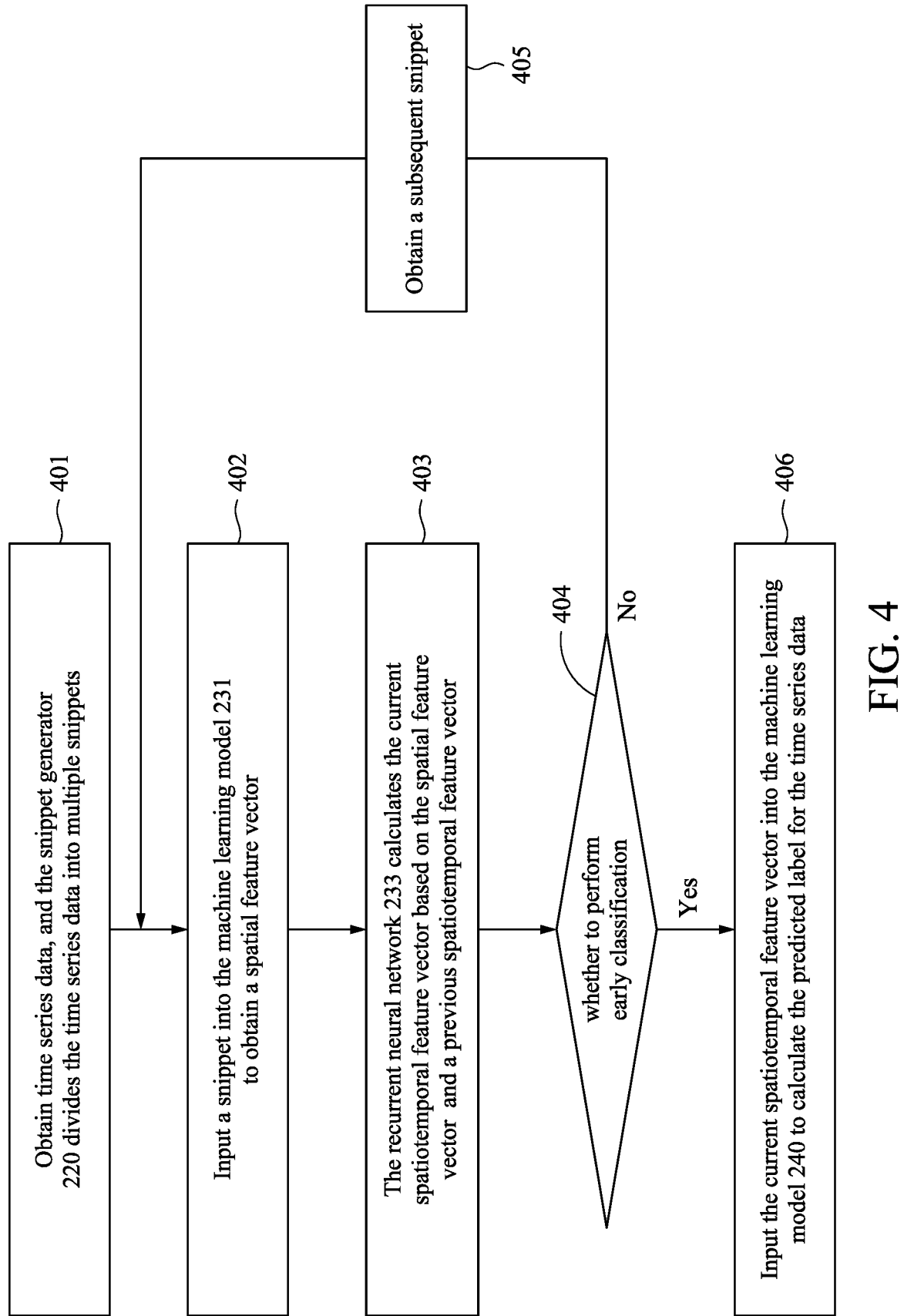

Obtain a subsequent snippet — 405

Obtain time series data, and the snippet generator 220 divides the time series data into multiple snippets — 401

Input a snippet into the machine learning model 231 to obtain a spatial feature vector — 402

The recurrent neural network 233 calculates the current spatiotemporal feature vector based on the spatial feature vector and a previous spatiotemporal feature vector — 403 whether to perform early classification — 404

No

Yes

Input the current spatiotemporal feature vector into the machine learning model 240 to calculate the predicted label for the time series data — 406

FIG. 4

EARLY CLASSIFICATION METHOD AND ELECTRICAL DEVICE FOR MULTI-OBJECTIVE OPTIMIZATION

BACKGROUND

Field of Invention

The model proposed in this disclosure is referred to as "snippet policy network", which can make classifications before fully analyzing the data and achieving multi-objective optimization. This disclosure also introduces an electrical device for executing the classification.

Description of Related Art

The Electrocardiogram (ECG) is a class of multivariate time series data, from which valuable information about a patient's health can be provided through analysis. However, existing methods for ECG analysis do not consider real-world situations, such as early classification. Some conventional practices require complete ECG data to determine abnormalities, but if classification results can be calculated earlier, more timely care can be provided.

SUMMARY

Embodiments of the present disclosure provide an early classification method performed by an electrical device. The early classification method includes: obtaining time series data, and dividing the time series data into multiple snippets; inputting one of the snippets into a first machine learning model to obtain a first spatial feature vector; calculating, by a recurrent neural network, a first spatiotemporal feature vector according to the first spatial feature vector and a previous spatiotemporal feature vector; and determining whether to perform an early classification according to the first spatiotemporal feature vector; if determining not to perform the early classification, obtaining a subsequent snippet of the snippets, inputting the subsequent snippet into the first machine learning model to obtain a second spatial feature vector, and calculating, by the recurrent neural network, a second spatiotemporal feature vector according to the second spatial feature vector and the first spatiotemporal feature vector; and if determining to perform the early classification, inputting the first spatiotemporal feature vector into a second machine learning model to calculate a predicted label of the time series data.

In some embodiments, the time series data is an electrocardiogram signal. The time series data includes multiple sampling points, each of the sampling points includes multiple variables, each of the variables corresponds to a sensing electrode, and each of the snippets corresponds to a heartbeat.

In some embodiments, the first machine learning model is a convolution neural network, the recurrent neural network is a long short-term memory (LSTM) network, and the second machine learning model is a fully connected layer.

In some embodiments, the step of determining whether to perform the early classification according to the first spatiotemporal feature vector includes: calculating a stopping probability according to the first spatiotemporal feature vector; if the one of the snippets is a first one, substituting the stopping probability into a function and determining if an output of the function is greater than a first threshold; and if the output of the function is greater than the first threshold, determining to perform the early classification, otherwise determining not to perform the early classification.

In some embodiments, the step of determining whether to perform the early classification according to the first spatiotemporal feature vector further includes: if the one of the snippets is not the first one, normalizing the stopping probability to obtain a normalized probability; calculating a maximum value among at least one preceding normalized probability; and determining if the normalized probability plus a difference between the normalized probability and the maximum value is greater than or equal to a second threshold, and determining to perform the early classification if yes, otherwise determining not to perform the early classification.

In some embodiments, the early classification method further includes: setting a reward according to a following equation. R is the reward, $\tau$ is a time point of determining whether to perform the early classification, T is a number of the snippets.

$$R = \begin{cases} \max(1, (\log(T - \log(\tau))), & \text{if correct classification} \\ -\max(1, (\log(T - \log(\tau))), & \text{otherwise} \end{cases}$$

In some embodiments, the early classification method further includes: setting a score objective function in a training phase based a following equation. N is a number of multiple t training samples, and $R^{(i)}$ is the reward of an i-th training sample of the training samples.

$$\text{Score}_{reward} = \frac{1}{N}\sum_{i=1}^{N} R^{(i)}$$

In some embodiments, the early classification further includes: setting an accuracy objective in the training phase based on a following equation. $y^{(i)}$ is a ground truth of the i-th training sample, $\hat{y}^{(i)}$ is the predicted label of the i-th training sample.

$$\text{Accuracy} = \frac{1}{N}\sum_{i=1}^{N}\left(y^{(i)} == \hat{y}^{(i)}\right)$$

In some embodiments, the early classification method further includes: setting an earliness objective in the training phase based on a following equation. $T^{(i)}$ is a number of the snippets of the i-th training sample.

$$\text{Earliness}_{snippet} = \frac{1}{N}\sum_{i=1}^{N}\frac{\tau^{(i)}}{T^{(i)}}$$

From another aspect, embodiments of the present disclosure provide an electrical device, including a memory storing multiple instructions and a processor communicatively connected to the memory. The processor is configured to execute the instructions to perform the early classification method.

The invention can be more fully understood by reading the following detailed description of the embodiment, with reference made to the accompanying drawings as follows.

BRIEF DESCRIPTION OF THE DRAWINGS

FIG. 3 is a diagram of pseudocode of the KGNA according to an embodiment.

FIG. 4 is a flowchart illustrating the early classification method in the testing phase according to an embodiment.

DETAILED DESCRIPTION

The using of "first", "second", "third", etc. in the specification should be understood for identifying units or data described by the same terminology, but are not referred to particular order or sequence.

Figure 1:
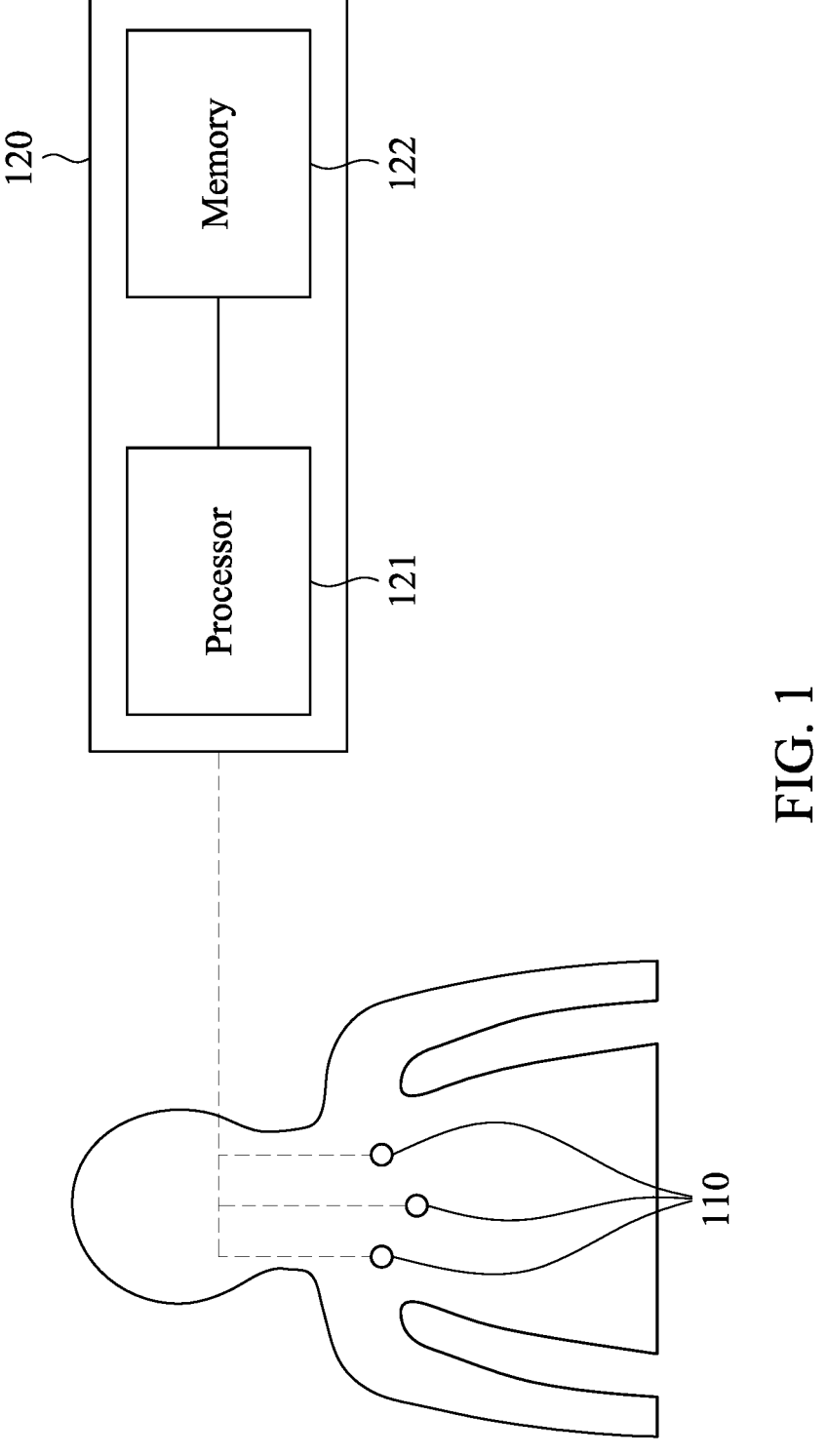
FIG. 1 illustrates an application scenario of an electrical device according to an embodiment.

FIG. 1 illustrates an application scenario of an electrical device according to an embodiment. Please refer to FIG. 1. In this scenario, multiple sensing electrodes 110 are placed on a user, and these sensing electrodes 110 are used to measure the user's Electrocardiogram (ECG) signals. The electrocardiogram signals are transmitted to an electrical device 120 through any wired or wireless communication means. The electrical device 120 can be implemented as any medical monitoring equipment or a mobile device, computer, server, etc., with computing capabilities. The electrical device 120 has a processor 121 and a memory 122. The processor 121 may be a central processor, microprocessor, microcontroller, digital signal processor, or a specialized application integrated circuit, etc. The memory 122 can be random access memory, read-only memory, flash memory, floppy disk, hard disk, optical disk, USB drive, or magnetic tape, etc., in which several instructions are stored. The processor 121 executes these instructions to perform an early classification method using a snippet policy network. This method is used for early classifying electrocardiogram signals into one of several categories. These categories can represent any health conditions, and this disclosure is not limited to these.

Herein, the aforementioned electrocardiogram signals are referred to as time series data for a more general description. The time series data includes multiple sampling points, each sampling point containing multiple variables, with each variable corresponding to one of the sensing electrodes 110 in FIG. 1. In other embodiments, the time series data can also be acceleration signals or angular velocity signals obtained through an inertial measurement unit, or temperature signals measured through a temperature sensor. This disclosure is not limited to these. In other words, the aforementioned multiple variables can also correspond to inertial measurement units or temperature sensors at different locations.

First, we represent the training set as D={$(X^{(1)}, y^{(1)})$, $(X^{(2)}, y^{(2)})$, . . . , $(X^{(N)}, y^{(N)})$ }, where N is the number of training samples, $X^{(1)}$ represents the time series data of the first training sample, and $y^{(1)}$ represents the ground truth of the first training sample, and so on. Each training sample has two dimensions, namely the variable dimension and the time dimension. A training sample is represented as $$X^{(i)} = \{x_1^i, x_2^i, \ldots, x_L^i\},$$

where i is a positive integer, and L represents the number of sampling points. Each sampling point has multiple variables, represented as $$x_l^i \in \mathbb{R}^M,$$

where l represents the sampling point, and M represents the number of the variables. For each training sample (i.e., time series data), our goal is to calculate a predicted label as early as possible.

Figure 2:
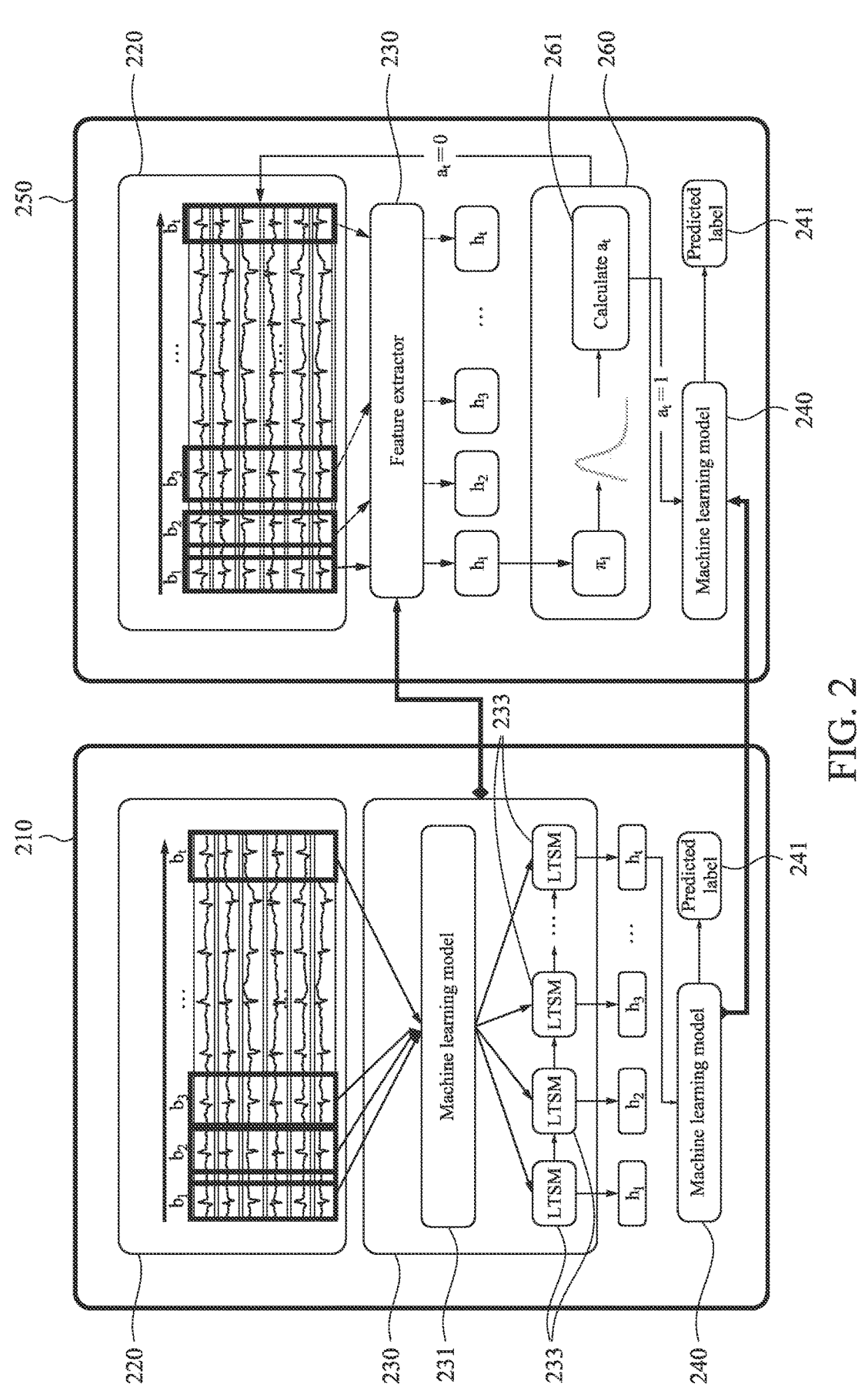
FIG. 2 illustrates a schematic diagram of the structure of the snippet policy network according to an embodiment.

FIG. 2 illustrates a schematic diagram of the structure of the snippet policy network according to an embodiment. Please refer to FIG. 2. The entire network structure is divided into two stages during learning, namely Snippet Representation Learning (SRL) 210 and Early Classification Timing Learning (ECTL) 250. First, a snippet generator 220 divides the time series data into multiple snippets. In this embodiment, each snippet represents one heartbeat, and any known algorithm can be used to implement the snippet generator 220. After capturing each heartbeat, normalization can be performed to set the same length, for example, by extending the beginning and end of the heartbeats, so that each snippet has the same length. Specifically, the input to the snippet generator 220 is $X^{(i)}$, and the output is $$B^{(i)} = \{b_1^i, b_2^i, \ldots, b_T^i\},$$

where T is the number of the snippets, and $$b_t^i$$

represents the t-th snippet in the i-th training sample, where i, t are positive integers. The ground truth of the snippet $$b_t^i$$

is inherited from (i.e., the same as) the ground truth of the training sample $X^{(i)}$.

Next, a feature extractor 230 is used to extract a feature vector of the snippet $$b_t^i$$

The feature extractor 230 includes a machine learning model 231 and a recurrent neural network 233. For example, the machine learning model 231 is a convolutional neural network, whose structure can adopt LeNet, AlexNet, VGG, GoogLeNet, ResNet, DenseNet, or YOLO (You Only Look Once), etc. This disclosure is not limited to these. The recurrent neural network 233 may be a long short-term memory (LSTM) network, a gated recurrent unit (GRU), or similar recurrent neural networks. In other embodiments, the machine learning model 231 can also be any suitable model such as a decision tree, random forest, or support vector machine.

The machine learning model 231 is used to extract the inner-spatial dependency of the snippet $$b_t^i.$$

After inputting the snippet $$b_t^i$$

into the machine learning model 231, a spatial feature vector $s_t$ is obtained. The operation can be represented by the following equation 1. Here, the snippet $$b_t^i$$

is simplified to $b_t$. The following operations are all targeted at the i-th training sample, and will not be elaborated below.

$$s_t = CNN(b_t) \qquad \text{[Equation 1]}$$

Next, the spatial feature vector $s_t$ is inputted into the recurrent neural network 233, which is used to extract temporal relationship between different snippets. The operation of the recurrent neural network 233 can be expanded, and the multiple recurrent neural networks 233 illustrated in FIG. 2 represent different time. Whenever one spatial feature vector $s_t$ is inputted, the recurrent neural network 233 will calculate the current snippet's spatiotemporal feature vector $h_t$ based on the current spatial feature vector $s_t$ and the spatiotemporal feature vector $h_{t-1}$ of the previous snippet. The operation of the recurrent neural network 233 can be represented by the following equation 2.

$$h_t = LSTM(s_t, h_{t-1}) \qquad \text{[Equation 2]}$$

Through such operations, the spatiotemporal feature vector $h_t$ combines both spatial and temporal correlations, in other words, the information from previous snippets is continuously propagated.

After processing all snippets, the spatiotemporal feature vector $h_t$ is inputted into a machine learning model 240 to calculate a predicted label 241. This machine learning model 240 can be a fully connected layer, but this disclosure is not limited to this. The operation of the machine learning model 240 can be represented by the following equation 3.

$$\hat{y} = D(h_t) = softmax(W_D \cdot h_t + b_D) \qquad \text{[Equation 3]}$$

In which $W_D$ and $b_D$ are parameters to be trained. softmax( ) is a softmax function. $\tilde{y}$ is a predicted vector, where each element represents the probability of the corresponding category. Through the following equation 4, the category with the highest probability is selected, and $\hat{y}$ is the predicted label 241.

$$\hat{y} = \operatorname{argmax}D(h_t) \qquad \text{[Equation 4]}$$

The ECTL 250 includes the snippet generator 220, the feature extractor 230, a decision agent 260, and the machine learning model 240, where the snippet generator 220, the feature extractor 230, and the machine learning model 240 have already been trained in the SRL 210. The decision agent 260 is used to determine whether to perform early classification based on the spatiotemporal feature vector $h_t$. The time series data consists of T snippets. If the decision agent 260 determines to perform the early classification before processing the last snippet, it can output the predicted label early without considering subsequent snippets. If the decision agent 260 determines not to perform the early classification, it continues to process the next snippet until all snippets have been processed, then it outputs the predicted label.

In this context, we use the concept of reinforcement learning to explain the decision agent 260. Here we need to define state, policy, and reward. The state is defined as H={$h_1$, $h_2$, . . . , $h_T$}, using the spatiotemporal feature vector $h_t$ to represent the current state of the environment. Furthermore, the policy is used to decide the next action based on the current state. This policy is a function that maps the state to a distribution of actions and can be represented by the following equation 5.

$$\pi_t = W_\pi \cdot h_t + b_\pi \qquad \text{[Equation 5]}$$

In this case, $W_\pi$ and $b_\pi$ are parameters that need to be trained. $\pi_t$ is a scalar, representing the probability of performing the early classification, also referred to as a stopping probability. The decision agent 260 calculates a value $\alpha_t$ at step 261. When this value $\alpha_t$ is 1, it means that the early classification should be performed. When this value $\alpha_t$ is 0, it means that the early classification should not be performed. We will discuss this in two situations. The first situation is when processing the first snippet $h_1$ (when t=1), and at this time, the value $\alpha_t$ is calculated according to the following equation 6.

$$a_t = \begin{cases} 1, \text{ if sigmoid}(\pi_t) > \epsilon \\ 0, \text{ otherwise} \end{cases}, t = 1 \qquad \text{[Equation 6]}$$

Where $\epsilon$ is a threshold. In other words, when processing the first snippet, the stopping probability $\pi_t$ is input into a sigmoid function. If the output of this function is greater than the threshold $\epsilon$, then the value $a_t$ is set to be 1, and the early classification is performed. If the output of the function is not greater than the threshold $\epsilon$, then the value $a_t$ is set to be 0, and the early classification is not performed.

Next, we discuss the second case, which is when the currently processed snippet is not the first snippet (t>1). In this case, the stopping probability $\pi_t$ is normalized as shown in the following Equation 7.

$$\hat{\pi}_i = \frac{e^{\pi_i}}{\Sigma_{j=1}^t e^{\pi_j}}, i = 1,2, \dots , t \qquad \text{[Equation 7]}$$

The $\hat{\pi}_i$ is referred to as the normalized probability. All normalized probabilities constitute a set $\hat{P}=\{\hat{\pi}_1, \hat{\pi}_2, \dots , \hat{\pi}_t\}$. Next, the maximum value of preceding normalized probabilities is calculated, which is the maximum value among the other normalized probabilities in set $\hat{P}$ excluding $\hat{\pi}_t$, as shown in the following Equation 8.

$$\pi'^{max} = \max(\hat{P} - \hat{\pi}_t) \qquad \text{[Equation 8]}$$

The $\pi'^{max}$ is referred to as the maximum value stated above. After calculating the maximum value, the value $a_t$ is computed according to the following equation 9.

$$a_t = \begin{cases} 1, & \text{if } \hat{\pi}_t + (\hat{\pi}_t - \pi'^{max}) \geq 1 \\ 0, & \text{otherwise} \end{cases}, t > 1 \qquad \text{[Equation 9]}$$

In other words, if the normalized probability $\hat{\pi}_t$ plus the difference $(\hat{\pi}_t - \pi'^{max})$ between the normalized probability and the maximum value is greater than or equal to a second threshold (e.g., 1), the value $a_t$ is set to be 1 and the early classification is performed. Otherwise, $a_t$ is set to be 0 and the early classification is not performed. The above equation 9 is used to determine whether the current stopping probability is significantly larger than all previous stopping probabilities, indicating that there is sufficient confidence to perform the early classification.

After completing the step 261, if the value $a_t$ is 0, it returns to the snippet generator 220 to process the subsequent snippet, which is t=t+1. If the numerical value $a_t$ is 1, then the machine learning model 240 calculates the predicted label based on the spatiotemporal feature vector $h_t$, as written in the above equation 3 and equation 4.

The aforementioned reward is defined as follows in equation 10.

$$R = \begin{cases} \max(1, (\log(T - \log(\tau))), & \text{if correct classification} \\ -\max(1, (\log(T - \log(\tau))), & \text{otherwise} \end{cases} \qquad \text{[Equation 10]}$$

Where $\tau$ represents the time point (i.e., snippet) of determining whether to perform the early classification, and R is the reward. Equation 10 is designed such that if a correct classification is predicted at a very early stage, a high score is awarded; if an incorrect classification is made early, a low score is given.

The SRL 210 and ECTL 250 use different optimization strategies. The SRL 210 employs a gradient-based update method, while the ECTL 250 adopts the Knee-guided Neuroevolution Algorithm (KNGA), which will be detailed below.

The SRL 210 is intended to train the snippet generator 220, the machine learning model 231, the recurrent neural network 233, and the machine learning model 240. Here, cross-entropy loss can be used as the loss function, as shown in the following equation 11.

$$\text{loss} = -\sum_k^K y^k \log \tilde{y}^k \qquad \text{[Equation 11]}$$

Where k is a positive integer, representing the category, and K is the number of all categories. $y^k$ is the ground truth, while $\tilde{y}^k$ is the predicted label. However, this disclosure is not limited to this, and in other implementations, the Mean Square Error (MSE), Mean Absolute Error (MAE), Huber loss function, Log-Cosh loss function, etc., can also be used.

The procedure for updating parameters can adopt principles such as Gradient Descent, Backpropagation, etc., but this disclosure is not limited to these.

The ECTL 250 is intended to train the decision agent 260. Here, multiple objectives are set, including an accuracy objective, an earliness objective, and a score objective. The accuracy objective is as shown in the following equation 12.

$$\text{Accuracy} = \frac{1}{N} \sum_{i=1}^{N} (y^{(i)} == \hat{y}^{(i)}) \qquad \text{[Equation 12]}$$

$y^{(i)}$ represents the ground truth of the i-th training sample, and $\hat{y}^{(i)}$ is the predicted label of the i-th training sample. The accuracy is better when it's higher. In addition, the earliness objective is as shown in the following equation 13.

$$\text{Earliness}_{snippet} = \frac{1}{N} \sum_{i=1}^{N} \frac{\tau^{(i)}}{T^{(i)}} \qquad \text{[Equation 13]}$$

$\tau^{(i)}$ is the time point at which early classification is performed in the i-th training sample. $T^{(i)}$ is the number of snippets in the i-th training sample. The earliness Earliness$_{snippet}$ is better when it's lower. The score objective is as shown in the following equation 14.

$$\text{Score}_{reward} = \frac{1}{N} \sum_{i=1}^{N} R^{(i)} \qquad \text{[Equation 14]}$$

$R^{(i)}$ is the reward (i.e. score) of the i-th training sample, and this reward Score$_{reward}$ is better when it's higher. The above three objectives will be combined together, as shown in the triobjective optimization problem in the following equation 15.

$$\begin{cases} \max(\text{Accuracy}) \\ \min(\text{Earliness}_{snippet}) \\ \max(\text{Score}_{reward}) \end{cases} \qquad \text{[Equation 15]}$$

Here, an evolution-based method can be used to determine the parameters in the decision agent 260. Each evolution will perturb the parameters of the neural network. Since there are many parameters, it is not easy to find a balance among these three objectives. Therefore, the method adopted here considers two points. The first is to identify the knee solution, which represents the best balance. The second is to explore boundary solutions. The main flow of the KGNA is as shown in the pseudocode 300 of FIG. 3. In the first line, the parameter g is initialized. The second line initializes the network parameter $\rho_g$. In line 4, n noises are generated to form a set S. In line 5, multiple variables are generated according to the set S and the parameter $\rho_g$ to form a temporary set $V_{set}$. In line 6, non-dominated variables are selected from the set $V_{set}$ to form a set $N_{set}$. In line 7, the knee solutions and boundary solutions are identified from the set $N_{set}$, and the parameters of these solutions are set as the parameters $\rho_{g+1}$ for the next iteration. Finally, in lines 8 and 9, the gradient is calculated and the parameters are updated. Regarding non-dominance, knee solutions, and boundary solutions, please refer to the following paper: Zhang, Kai, Gary G. Yen, and Zhenan He. "Evolutionary algorithm for knee-based multiple criteria decision making." IEEE Transactions on Cybernetics 51.2 (2019): 722-735. In other embodiments, other evolution-based methods can be used, such as genetic algorithms, particle swarm optimization, to determine the parameters of the decision agent 260, but this disclosure is not limited to these.

FIG. 4 is a flowchart illustrating the early classification method in the testing phase according to an embodiment. Please refer to FIGS. 2 and 4. In step 401, time series data is obtained, and the snippet generator 220 divides the time series data into multiple snippets. In step 402, the snippet $b_t$ is input into the machine learning model 231 to obtain the spatial feature vector $s_t$ (also referred to as the first spatial feature vector). In step 403, the current spatiotemporal feature vector $h_t$ (also referred to as the first spatiotemporal feature vector) is calculated by the recurrent neural network 233 based on the spatial feature vector $s_t$ and the previous spatiotemporal feature vector $h_{t-1}$. In step 404, the decision agent 260 determines whether to perform early classification based on the spatiotemporal feature vector $h_t$. If it is determined not to perform the early classification, in step 405, the subsequent snippet $b_{t+1}$ is obtained and the process returns to step 402. At this time, the subsequent snippet $b_{t+1}$ is input into the machine learning model 231 to obtain a new spatial feature vector $s_{t+1}$ (also referred to as the second spatial feature vector). In step 403, the new spatiotemporal feature vector $h_{t+1}$ (also referred to as the second spatiotemporal feature vector) is calculated through the recurrent neural network 233 based on the new spatial feature vector $s_{t+1}$ and the previous spatiotemporal feature vector $h_t$, then step 404 is repeated. If it is determined to perform the early classification (without processing the subsequent snippet) or if all snippets have been processed, then proceed to step 406. In step 406, the current spatiotemporal feature vector is input into the machine learning model 240 to calculate the predicted label for the time series data. Each step in FIG. 4 has been detailed above and therefore the description will not be repeated here. Notably, the steps in FIG. 4 can be implemented as multiple instructions or circuits, but the disclosure is not limited to this. In addition, the method of FIG. 4 can be performed in conjunction with the above embodiments or can be performed independently. In other words, other steps can also be added between the steps in FIG. 4.

The above-mentioned early classification method can make classifications earlier when processing time series data. In the application of electrocardiograms, it can provide more timely information. This method can also be applied in other fields, such as temperature sensors, gravity acceleration sensors, etc. In the examples above, each sampling point has multiple variables, but there can be only a single variable in other implementations.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An early classification method performed by an electrical device, wherein the early classification method comprises:

obtaining time series data, and dividing the time series data into a plurality of snippets;

inputting one of the snippets into a first machine learning model to obtain a first spatial feature vector;

calculating, by a recurrent neural network, a first spatiotemporal feature vector according to the first spatial feature vector and a previous spatiotemporal feature vector;

determining whether to perform an early classification according to the first spatiotemporal feature vector, comprising:

calculating a stopping probability according to the first spatiotemporal feature vector;

if the one of the snippets is a first one, substituting the stopping probability into a function and determining if an output of the function is greater than a first threshold; and if the output of the function is greater than the first threshold, determining to perform the early classification, otherwise determining not to perform the early classification;

if determining not to perform the early classification, obtaining a subsequent snippet of the snippets, inputting the subsequent snippet into the first machine learning model to obtain a second spatial feature vector, and calculating, by the recurrent neural network, a second spatiotemporal feature vector according to the second spatial feature vector and the first spatiotemporal feature vector; and if determining to perform the early classification, inputting the first spatiotemporal feature vector into a second machine learning model to calculate a predicted label of the time series data.

2. The early classification method of claim 1, wherein the time series data is an electrocardiogram signal, the time series data comprises a plurality of sampling points, each of the sampling points comprises a plurality of variables, each of the variables corresponds to a sensing electrode, and each of the snippets corresponds to a heartbeat.

3. The early classification method of claim 1, wherein the first machine learning model is a convolution neural network, the recurrent neural network is a long short-term memory (LSTM) network, and the second machine learning model is a fully connected layer.

4. The early classification method of claim 1, wherein the step of determining whether to perform the early classification according to the first spatiotemporal feature vector further comprises:

if the one of the snippets is not the first one, normalizing the stopping probability to obtain a normalized probability;

calculating a maximum value among at least one preceding normalized probability; and determining if the normalized probability plus a difference between the normalized probability and the maximum value is greater than or equal to a second threshold, and determining to perform the early classification if yes, otherwise determining not to perform the early classification.

5. The early classification method of claim 4, further comprising:

setting a reward according to a following equation:

$$R = \begin{cases} \max(1, (\log(T - \log(\tau))), & \text{if correct classification} \\ -\max(1, (\log(T - \log(\tau))), & \text{otherwise} \end{cases}$$

wherein R is the reward, $\tau$ is a time point of determining whether to perform the early classification, T is a number of the snippets.

6. The early classification method of claim 5, further comprising:

setting a score objective function in a training phase based a following equation:

$$\text{Score}_{reward} = \frac{1}{N} \sum_{i=1}^{N} R^{(i)}$$

wherein N is a number of a plurality of training samples, $R^{(i)}$ is the reward of an i-th training sample of the training samples.

7. The early classification method of claim 6, further comprising:

setting an accuracy objective in the training phase based on a following equation:

$$\text{Accuracy} = \frac{1}{N} \sum_{i=1}^{N} \left( y^{(i)} == \hat{y}^{(i)} \right)$$

wherein $y^{(i)}$ is a ground truth of the i-th training sample, $\hat{y}^{(i)}$ is the predicted label of the i-th training sample.

8. The early classification method of claim 7, further comprising:

setting an earliness objective in the training phase based on a following equation:

$$\text{Earliness}_{snippet} = \frac{1}{N} \sum_{i=1}^{N} \frac{\tau^{(i)}}{T^{(i)}}$$

wherein $T^{(i)}$ is a number of the snippets of the i-th training sample.

9. An electrical device comprising:

a memory storing a plurality of instructions; and a processor communicatively connected to the memory and configured to execute the instructions to perform a plurality of steps:

obtaining time series data, and dividing the time series data into a plurality of snippets;

inputting one of the snippets into a first machine learning model to obtain a first spatial feature vector;

calculating, by a recurrent neural network, a first spatiotemporal feature vector according to the first spatial feature vector and a previous spatiotemporal feature vector;

determining whether to perform an early classification according to the first spatiotemporal feature vector, comprising:

calculating a stopping probability according to the first spatiotemporal feature vector;

if the one of the snippets is a first one, substituting the stopping probability into a function and determining if an output of the function is greater than a first threshold; and if the output of the function is greater than the first threshold, determining to perform the early classification, otherwise determining not to perform the early classification;

if determining not to perform the early classification, obtaining a subsequent snippet of the plurality of snippets, inputting the subsequent snippet into the first machine learning model to obtain a second spatial feature vector, and calculating, by the recurrent neural network, a second spatiotemporal feature vector according to the second spatial feature vector and the first spatiotemporal feature vector; and if determining to perform the early classification, inputting the first spatiotemporal feature vector into a second machine learning model to calculate a predicted label of the time series data.

10. The electrical device of claim 9, wherein the time series data is an electrocardiogram signal, the time series data comprises a plurality of sampling points, each of the sampling points comprises a plurality of variables, each of the variables corresponds to a sensing electrode, and each of the snippets corresponds to a heartbeat.

11. The electrical device of claim 9, wherein the first machine learning model is a convolution neural network, the recurrent neural network is a long short-term memory (LSTM) network, and the second machine learning model is a fully connected layer.

12. The electrical device of claim 9, wherein the step of determining whether to perform the early classification according to the first spatiotemporal feature vector further comprises:

if the one of the snippets is not the first one, normalizing the stopping probability to obtain a normalized probability;

calculating a maximum value among at least one preceding normalized probability; and determining if the normalized probability plus a difference between the normalized probability and the maximum value is greater than or equal to a second threshold, and determining to perform the early classification if yes, otherwise determining not to perform the early classification.

13. The electrical device of claim 12, wherein the plurality of steps further comprise:

setting a reward according to a following equation:

$$R = \begin{cases} \max(1, (\log(T - \log(\tau))), \text{ if correct classification} \\ -\max(1, (\log(T - \log(\tau))), \text{ otherwise} \end{cases}$$

wherein R is the reward, $\tau$ is a time point of determining whether to perform the early classification, T is a number of the snippets.

14. The electrical device of claim 13, wherein the plurality of steps further comprise:

setting a score objective function in a training phase based on a following equation:

$$\text{Score}_{reward} = \frac{1}{N} \sum_{i=1}^{N} R^{(i)}$$

wherein N is a number of a plurality of t training samples, $R^{(i)}$ is the reward of an i-th training sample of the training samples.

15. The electrical device of claim 14, wherein the plurality of steps further comprise:

setting an accuracy objective in the training phase based on a following equation:

$$\text{Accuracy} = \frac{1}{N}\sum_{i=1}^{N}\left(y^{(i)} == \hat{y}^{(i)}\right)$$

wherein $y^{(i)}$ is a ground truth of the i-th training sample, $\hat{y}^{(i)}$ is the predicted label of the i-th training sample.

16. The electrical device of claim 15, wherein the plurality of steps further comprise:

setting an earliness objective in the training phase based on a following equation:

$$\text{Earliness}_{snippet} = \frac{1}{N}\sum_{i=1}^{N}\frac{\tau^{(i)}}{T^{(i)}}$$

wherein $T^{(i)}$ is a number of the snippets of the i-th training sample.

* * * * *